(No Model.)
J. J. SEIFERT.
HEAT PROTECTOR FOR BAKE OVENS.
No. 398,192. Patented Feb. 19, 1889.
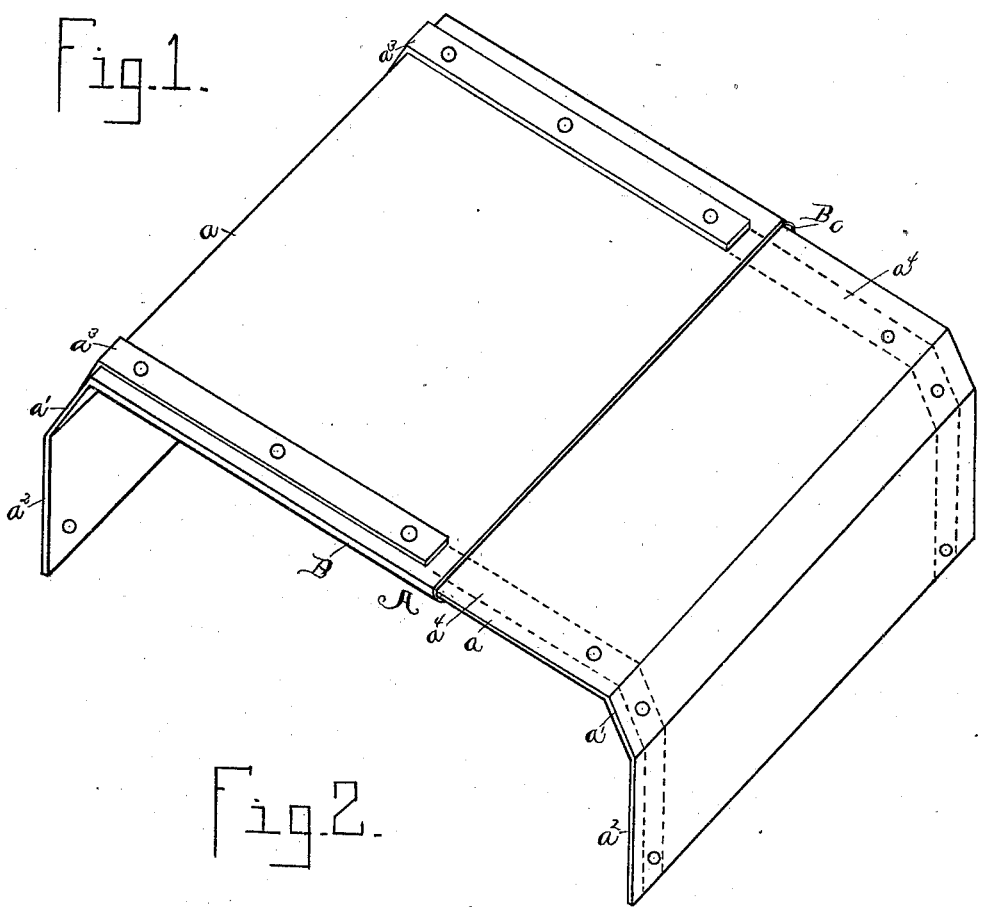
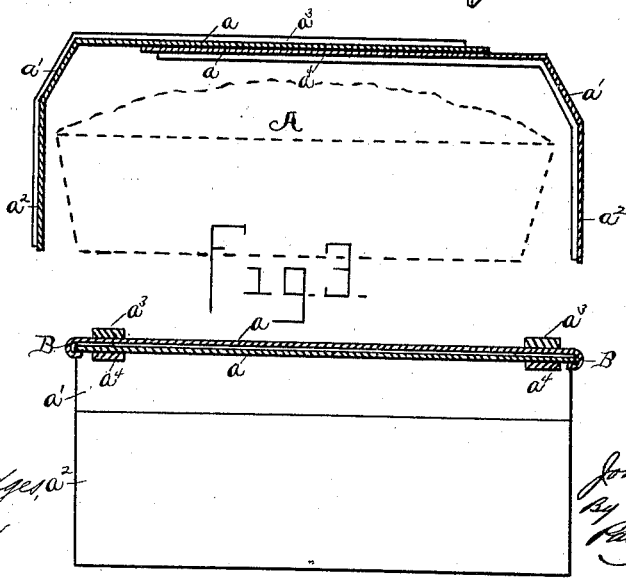
Witnesses.
Wm. S. Hodges
C. A. Guy
Inventor,
John J. Seifert,
By Patrick O'Farrell,
Attorney.

UNITED STATES PATENT OFFICE.

JOHN JULIUS SEIFERT, OF GILMORE CITY, IOWA.

HEAT-PROTECTOR FOR BAKE-OVENS.

SPECIFICATION forming part of Letters Patent No. 398,192, dated February 19, 1889.

Application filed October 29, 1888. Serial No. 289,381. (No model.)

*To all whom it may concern:*

Be it known that I, JOHN JULIUS SEIFERT, a citizen of the United States of America, residing at Gilmore City, in the county of Humboldt and State of Iowa, have invented certain new and useful Improvements in Heat-Protectors for Bake-Ovens, of which the following is a specification, reference being had therein to the accompanying drawings.

This invention pertains to certain new and useful improvements in heat-protectors for baking-ovens.

The invention consists in a shield or protector designed to span or cover a dripping-pan, together with the dough contained therein, during the baking of the same, the shield or protector being extensible, so as to be adjustable to divers-sized pans.

In the accompanying drawings, Figure 1 is a view in perspective of my invention. Fig. 2 is a longitudinal sectional view thereof, showing an inclosed baking-pan in dotted lines. Fig. 3 is a transverse sectional view.

Referring to the drawings, A designates the shield or heat-protector, composed of two sections, $a\ a$, adjustable relatively to each other. Each section $a$ has its outer end bent at a slight angle, as at $a'$, and this is extended into a vertical portion, $a^2$, which is designed to rest upon the bottom of an oven or a partition therein. These sections are braced or strengthened by means of inner and outer side strips, $a^3\ a^4$, secured, respectively, to the outer and inner surfaces of the said sections along the sides thereof. The side edges of the upper horizontal portion of the outer section are bent to form guideways B B, wherein fit or slide the side edges of the inner section. By this means the two sections are united or held together and are capable of being extended or moved the desired distance apart, according to the size and number of dripping-pans the shield is designed to cover.

The shield will protect the dough from burning or overrunning on the top and sides, caused by too great a supply of heat, and by this means will assist the dough in the pans to rise fast while the bread or dough is baking from the bottom. When the dough or bread is raised to a proper height, the shield or protector can be removed and the top and sides will soon be browned by the heat of the oven.

It will be particularly noticed that by making the shield or protector adjustable the same is applicable to one or more pans of various sizes.

I claim as my invention—

1. The herein-described improved bread shield or protector, composed of adjustable sections, substantially as set forth.

2. The herein-described improved bread shield or protector, composed of adjustable sections having lower vertical ends, substantially as set forth.

3. The herein-described improved bread shield or protector, composed of adjustable sections, one of which has guideways for the other section, substantially as set forth.

In testimony whereof I affix my signature in presence of two witnesses.

JOHN JULIUS SEIFERT.

Witnesses:
HOMES TIFFANY,
PRUDENCE L. CHIPMAN.